INVENTOR:
NORMAN F. PRATT,
BY
ATTORNEY.

TENSIONAL STRAIN

TO PUSH-PULL AMPLIFIER

TO PUSH-PULL AMPLIFIER

TO PUSH-PULL AMPLIFIER

TO PHASE DETECTOR

OSCILLATOR

INVENTOR:
NORMAN F. PRATT,
BY
ATTORNEY.

3,535,625
STRAIN AND FLAW DETECTOR
Norman F. Pratt, Scottsdale, Ariz., assignor to The Garrett Corporation, Los Angeles, Calif., a corporation of California
Continuation of application Ser. No. 354,243, Nov. 24, 1964. This application Apr. 22, 1968, Ser. No. 723,331
Int. Cl. G01r 33/12
U.S. Cl. 324—37                                    1 Claim

ABSTRACT OF THE DISCLOSURE

An apparatus to detect the presence and location of exising stresses, latent strains and surface or internal flaws in ferromagnetic and diamagnetic materials. A differential transformer is used to scan the material. The primary and secondary windings, thereof, are mounted on a magnetic core, which can take a number of different shapes, i.e. L-shaped, E-shaped, H-shaped or C-shaped. The primary is energized by an oscillator through a push-pull amplifier. The secondary windings are connected in series opposition through a balancing network, and a voltage divider to an amplifier tuned to the oscillator frequency. The outputs of the tuned amplifier and the oscillator are fed to a phase detector with the output of the phase detector yielding the desired information.

---

This is a continuation of application Ser. No. 354,243, filed Nov. 24, 1964.

This invention relates to an improved method and apparatus for detecting inhomogeneities, structural non-uniformities, discontinuities, and other anomalies in ferromagnetic and conductive paramagnetic and diamagnetic materials. In particular, this invention makes it possible to detect the presence and location of existing stresses, latent strains, and surface or internal flaws in these materials.

Through the practice of this invention it is possible for relatively unskilled operators to "map" tensional or compressional stresses and strains, as well as specify the locations of fractures, voids and other anomalies whether or not they are visible, internal or external, or whether the material is ferromagnetic or merely conductive.

In general, these exceptional results are achieved through the use of a differential-transformer type transducer for scanning the specimen, an oscillator for driving the transducer, and signal-processing apparatus comprising a tuned bandpass amplifier, phase-sensitive rectifier, and appropriate readout devices.

Although some of the basic principles and structures utilized in this invention have been known to the prior art, its extraordinary capabilities appear to be attributable to significant differences in structure, operation, and method of use. For example, many types of conventional strain detectors are responsive to electromagnetic effects. One type is characterized by a sensor primarily responsive to eddy-currents. The main limitation of these instruments in that they are incapable of sensing distortions in eddy-current patterns attributable to structural abnormalities including crystalline dislocations, stresses and strains, and discontinuities of relatively small magnitude at significant depths below the surface of the specimen. Many kinds of internal irregularities and residual strains remain undetected.

Another kind of flaw detector, responsive primarily to variations in magnetic permeability, has been used to detect the stresses and strains present in ferromagnetic materials. The disadvantages of these instruments include insensitivity to small or incipient structural defects and residual strains within the body of the material, the difficulty of instrument calibration, and the highly-developed skills required to interpret results properly.

Notwithstanding the efforts of experts in the field, the aforementioned probelms remained unsolved until the advent of this invention. Now it is possible for relatively unskilled workers to locate and evaluate internal or external stresses and strains, and virtually all other types of structural imperfections within electrically - conductive paramagnetic, ferromagnetic, and diamagnetic materials. Moreover, this can be done without destruction or physical deformation of the specimen, and, in many instances without removal of the specimen from its associated apparatus.

For example, consider one of the important uses of this invention. The need for a fast, simple method and apparatus for nondestructively testing turbine blades and vanes has been recognized for many years. It is desirable to test these critical components for fractures, incipient defects, and abnormal residual strain patterns which signify impending structural failure. Furthermore, it is desirable to make these tests without taking the engine apart.

These objectives could not be achieved with the instruments and techniques available to the prior art. For example, to detect some types of incipient fractures, prior-art procedures involved removal of the turbine wheel and buckets, and then examining each through the use of special dye penetrants, static magnetic particle techniques known as "Magnaflux," detection of eddy-current pattern distortions, X-ray examination, or ultrasonic techniques. Needless to say, these procedures are very time consuming and expensive, and skilled technicians are required to do the requisite disassembly, inspection, interpretation of results, and reassembly of the engine. Moreover, these equipments and procedures do not reveal many types of residual strains, subsurface flaws, cracks and crystalline dislocations, and are of little help in predicting the failure of components attributable to these and other causes.

With this invention these disadvantages are obviated and the aforementioned objectives may be achieved. Turbine blades and vanes may be inspected without complete disassembly, and relatively unskilled personnel can detect virtually every type of structural defect likely to cause failure during normal operation between preventive maintenance periods.

It appears that prior-art detectors have been capable of responding principally to eddy-current field distortions or to variations in magnetic permeability, but not both. This invention provides an instrument highly sensitive to both types of phenomena. Furthermore, it appears that the transducers utilized as sensors in prior-art detectors have been overdriven. This has relegated to insignificance those components of the transducer output signal which represent incipient defects, stresses, strains, and other very small irregularities.

In other words, the achievement of superior results through use of the method and apparatus of the invention is largely the result of novel detector apparatus highly responsive not only to eddy-current field distortions but also to permeability variations caused by small stresses, strains, flaws and other structural irregularities in the test specimen. Unlike eddy-current or permeability detectors known to the prior art, the apparatus of this invention is capable of sensing subtle or very small "structural-electromagnetic" irregularities in the test specimen; that is, any structural abnormality including but not limited to internal or external crystalline dislocations, uniform or gradient stresses and residual strains, and incipient or actual fractures, voids, or other structural imperfections affecting the permeability or magnetic flux pattern in or surrounding the material. This enhancement of sensitivity arises from the use of a miniaturized sensing probe comprising a transformer transducer, preferably of the differential-transformer type, having a primary winding supplied with audio-frequency alternating current of relatively low amplitude.

In contrast, prior-art detectors have been designed to develop high-energy, high-frequency magnetic fields in the test specimen. This has been regarded as necessary in order to provide an output signal relatively free of spurious components, and of an amplitude suitable for display with little or no amplification. It has been discovered, however, that the magnetostrictive effects of these strong magnetic fields create mechanical stresses of their own large enough to render existing minor irregularities virtually insignificant, so that the latter will have such a slight effect on the phase and amplitude of the relatively-large output signal that they are very difficult if not impossible to detect.

In the sensing transducers of this invention the magnetomotive force of the alternating magnetic field developed in the test specimen may be regarded as a carrier, somewhat analogous to the carrier signal of a communication transmitter, which will be modulated in amplitude and phase by any structural abnormalities present in the portion of the test specimen through which the magnetic carrier is passing. A will be appreciated by those conversant with the requisites for detecting information present in modulated carrier signals, the ratio of the modulation components, to the carrier is one of the most important considerations in minimizing the loss of information during transmission and detection. It has been discovered that a similar consideration is of the utmost importance in achieving sensitivity to the amplitude and phase changes of an electric signal representing the modulated magnetic flux present in the sensing transducer of this invention. This has been confirmed empirically in an experiment which demonstrated the variation in useful transducer output signal with fluctuations in the strength of the carrier field developed in the test specimen. Thus, it has been found possible to adjust the magnetomotive force of the magnetic-carrier field to the energy level which will provide maximum sensitivity to the structural-electromagnetic abnormalities of interest.

Accordingly, it is the discovery that relatively low energy magnetic carrier fields can be modulated and detected without "drowning out" the subtle structural-electromagnetic irregularities, in combination with novel apparatus highly-sensitive both to distortions in eddy-current field patterns and to variations in magnetic permeability, which appear to explain the extraordinary results achieved with this invention.

An exemplary embodiment of this invention generally comprises a differential-transformer type transducer in combination with a tuned amplifier coupled into audio and phase-sensitive readout devices. More specifically, the embodiment includes an E-core, differential-transformer type transducer mounted on the end of a probe, so that the ends of the legs of the E-core may be applied to the test specimen. A primary winding on the center leg of the E-core is coupled to an oscillator tuned, for example, to an audio frequency of two kilocycles per second. Each of the end legs of the E-core is provided with a secondary coil. The secondary coils effectively are wound or connected in series opposition, so that their respective voltages will be of opposite polarity, and the consequent output voltage of the transducer will be zero as long as the characteristics of the respective magnetic circuits interlinking the primary and secondary coils remain balanced.

Whenever the magnetic circuits of the transducer are unbalanced, an oscillatory output signal of two kilocycles per second is developed. The magnitude and phase of this signal will be determined by the type of magnetic material comprising the test specimen, and the differences in the magnetic characteristics of the respective portions of the test specimen spanning the two gaps of the E-core.

The resultant transducer output signal, if any, passes to a high-gain, narrow-bandwidth amplifier tuned to two kilocycles per second, and having an input impedance providing a good match to the low output impedance of the transducer.

A phase-sensitive rectifier coupled to the output of the tuned amplifier and to the two-kilocycle per second oscillator drives a meter movement to provide an output indication representing the shift in phase, if any, between the oscillatory transducer input and output signals.

An audio amplifier is coupled between the tuned amplifier and a loudspeaker to provide an aural indication of changes in the magnitude of the transducer output signal. Although a meter or other display device could be used for this purpose, the aural indication is desirable in many applications in order to warn an inattentive operator of the presence of a fracture or other discontinuity beneath the scanning transducer.

According to a first modification of the apparatus of this invention, the transducer probe utilizes a bent, or L-shaped, E-core differential-transformer type sensor. This device is especially useful in sensing the presence of uniformly-distributed stresses or strains within a test specimen.

A second modification of the apparatus of this invention is characterized by a transducer utilizing an H-core differential-transformer type sensor. The H-core sensor has a primary winding disposed on the cross-section of the H-core, and two secondary windings disposed, respectively, on the upper and lower sections of one of the vertical legs. The primary winding is coupled to the oscillator. As will be explained more fully below, the special utility of the H-core sensor is in making rapid "accept" or "reject" readings..

In a third modification of the apparatus of this invention, the differential-transformer type transducer is replaced with a transformer-type transducer having a C-core. The amplitude and phase of the transducer output signal developed in the single secondary winding is compared with a reference signal derived, for example, from the oscillator output voltage, to produce a difference signal representing an irregularity in the test specimen whenever the phase or amplitude of the former differs from the latter. Thus, the reference-signal portion of the oscillator output voltage represents the magnetic permeability and eddy-current field pattern of a specimen having desired structural-magnetic characteristics. A detector in accordance with this modification of the invention is especially useful in quantitative measurements of stress or strain, and, where the reference signal is adjusted to represent a predetermined limit of stress or strain, in making rapid "accept" or "reject" inspections.

From the foregoing it should be apparent that the important objectives of this invention include the provision of:

(1) A method and apparatus for detecting the presence and location of structural-electromagnetic abnormalities in diamagnetic, ferromagnetic, and paramagnetic electrically-conductive materials;

(2) A method and apparatus for detecting and indicating very small-to-large changes in the structural-electromagnetic characteristics of a test specimen;

(3) An apparatus for use by relatively unskilled personnel in the nondestructive testing of strain-retentive materials for the presence of residual strain, actual and incipient fractures, voids and other structural-electromagnetic abnormalities;

(4) An apparatus highly sensitive and responsive to variations in magnetic permeability and eddy-current field distortions for use by relatively unskilled personnel for nondestructively testing strain-retentive, electrically-conductive ferromagnetic, paramagnetic and diamagnetic materials for the presence of residual strain, actual and incipient fractures, voids and other structural-electromagnetic irregularities;

(5) A portable apparatus for testing for the presence of residual strains, and other imperfections in strain or shape-retentive, electrically-conductive paramagnetic, diamagnetic, and ferromagnetic materials;

(6) A portable apparatus for use in qualitatively testing shape-and-strain retentive materials for the presence and location of residual strains, actual and incipient fractures, voids, and other imperfections;

(7) A portable apparatus responsive to abnormalities in the structural-electromagnetic characteristics of a test specimen for indicating at least qualitatively the presence and location of uniform or gradient residual strains and actual or incipient, external or internal structural-electromagnetic imperfections;

(8) A method of detecting uniform or gradient residual strains and structural-electromagnetic abnormalities by applying a probe having a transformer type transducer to a test specimen, amplifying the resultant output signal of the transducer, sensing changes in phase of the amplified transducer signal, and transducing the amplified signal and the phase-sensitive rectifier output signal into perceptible form;

(9) A method of detecting uniform or gradient, internal or external, stresses, or residual strains and actual or incipient structural-electromagnetic abnormalities by energizing a differential-transformer type transducer having at least two air gaps with audio-frequency current, placing the air gap portions of the transducer at least in magnetic-relation to the surface of a test specimen, moving the transducer in a pattern to scan the surface of the specimen, amplifying selectively the resultant output signal of the transducer, if any, sensing phase variations between the amplified transducer signal and the audio-frequency current to produce a direct-current output signal, and transducing the ampilfied signal and the direct-current signal to produce perceptible indications signifying the presence of the aforementioned kinds of strain, stresses, or structural imperfections.

The text above is intended to summarize and explain the significance of this invention in relation to prior art problems. For a more complete understanding of the implementation and novel features of this invention, refer to the descriptive text below and to the drawings wherein.

Figure 1:
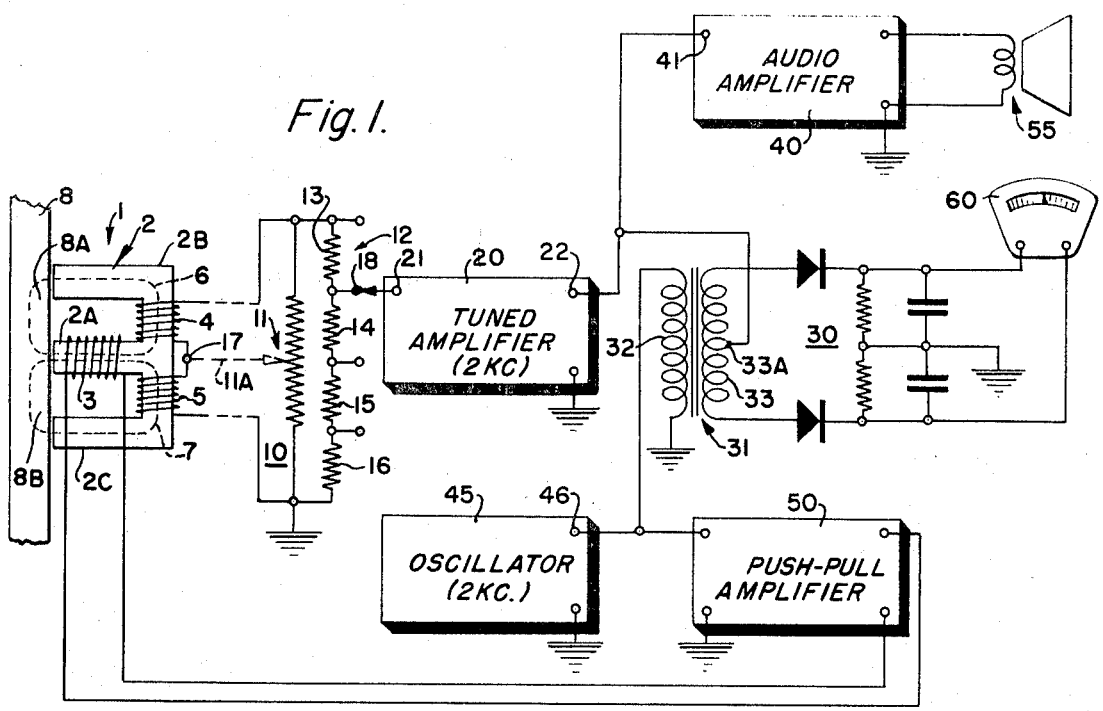
FIG. 1 is a block-schematic diagram representing the novel apparatus useful in the practice of this invention.

An embodiment of the detector of this invention, FIG. 1, generally comprises a differential-transformer type transducer 1, balancing and attenuating network 10, tuned amplifier 20, phase-sensitive rectifier 30, audio amplifier 40, oscillator 45, push-pull amplifier 50, and audio and visual readout devices 55 and 60, respectively. Although not shown in the drawings, it should be understood that the transducer 1 ordinarily is miniaturized and mounted on the tip of an elongated handle, probe, or other implement adapted to facilitate its application to the test specimen 8.

The transducer 1 is comprised of an E-core 2 made of magnetic material, a primary winding 3 disposed on the center leg 2A of the core, and first and second secondary windings 4 and 5. Although secondary windings 4 and 5 are shown disposed, respectively, on the upper and lower vertical sections of the core 2, this is done for convenience of illustration. Preferably, secondary windings 4 and 5 are disposed on end legs 2B and 2C. With this configuration two magnetic circuits are established along paths 6 and 7 respectively. The center leg 2A of the core is common to both magnetic paths 6 and 7. The first path 6 links the secondary coil 4 and the portion 8A of the test specimen 8 bridging the upper air gap of the core 2. The second path 7 links the secondary coil 5, and the portion 8B of the test specimen 8 bridging the lower gap of the core. As a result, the secondary windings 4 and 5 may be coupled inductively to primary winding 3 via magnetic paths 6 and 7 traversing the two gaps formed between the center leg 2A and two end legs 2B and 2C. Thus, if the magnetic impedances of the paths 6 and 7, including the impedances of the portions 8A and 8B of the test specimen 8 are equal, the respective output voltages of secondary windings 4 and 5 will be equal and opposite.

When the primary winding 3 is energized with alternating current supplied by oscillator 45, the transducer develops an output signal, usually on the order of a few microvolts, in response to inequalities in the magnetic characteristics of the specimen portions 8A and 8B, bridging the upper and lower air gaps of the transducer. Inasmuch as the magnetic characteristics of the test specimen 8 are uniform in the absence of structural-magnetic irregularities in the form of stress, residual strains, fractures, voids, and other nonuniformities, a transducer output signal signifies the existence of an external or internal irregularity in at least one of the portions of the test specimen bridged by the legs 2B and 2C. Because the air gaps between center leg 2A and end legs 2B and 2C are short, the location of fractures or voids, both small and large, is easy to establish.

It is important that the storage factor, or Q, of the transducer be made as large as possible in order to reduce the quadrature component, and the harmonics normally present in the transducer output voltage. This enables the use of amplifiers having high amplification factors without danger of overloading.

The balancing and attenuating network 10 comprises a potentiometer 11 in parallel with a voltage divider 12 made up of series-connected resistances 13, 14, 15 and 16. The respective lower ends of the potentiometer 11, resistor 16, and secondary winding 5 are coupled to a ground source of constant reference potential. The upper end of the balancing and attenuator network 10 is coupled to the upper end of the secondary winding 4. The intermediate junction 17 of secondary windings 4 and 5 is coupled to the potentiometer wiper arm 11A.

By placing a calibrating specimen known to have uniform magnetic characteristics across upper and lower air gaps of the E-core 2, and adjusting the potentiometer 11, the output voltage of the transducer 1 may be preset to zero. The voltage divider 12 makes it possible to adjust the effective input impedance of the tuned amplifier 20 to achieve maximum response without overloading. This adjustment is necessary, for the amplitude of the resultant output signal of the transducer may vary widely with the type of material comprising the test specimen 8.

The input terminal 21 of the tuned amplifier 20 is coupled to the output terminal 18 of voltage divider 12. In the preferred embodiment, the tuned amplifier 20 is designed to respond selectively to the two-kilocycle frequency of oscillator 45. The tuned amplifier 20 is conventional, and may conform to any one of several well-known amplifier designs. However, for best results, amplifier 20 should have linear amplification and stable temperature characteristics. The output terminal 22 of the tuned amplifier 20 is coupled to the input terminal 41 of audio amplifier 40, and to phase-sensitive rectifier 30 at the center tap 33A provided on the secondary winding 33 of the coupling transformer 31.

The oscillator 45 provides two-kilocycle output power for energizing the primary winding 3 of transducer 1, and to provide a reference signal for the phase-sensitive rectifier 30. The oscillator 45 is conventional, and may conform to any one of many well-known types. However, because the detector of this invention is highly-sensitive, it is important that the oscillator output power have stable frequency and amplitude characteristics.

The two-kilocycle output frequency of oscillator 45 appears to provide optimum transducer sensitivity and depth of detection. Tests performed with an actual embodiment of the E-core transducer 1 indicate that sensitivity also is maximized at a frequency of 10 kilocycles and, possibly, at various higher frequencies, but the effective depth at which irregularities can be detected is reduced somewhat on account of increased localization of the magnetic field and eddy-currents proximate to the surface of the test specimen.

The oscillator output terminal 46 is coupled directly to the primary winding 32 of coupling transformer 31, and to the transducer primary 3 via the push-pull amplifier 50. The push-pull amplifier 50 is conventional. Its purpose is to increase the output power of the oscillator 45 to a level appropriate for the transducer primary winding 3, and to isolate the transducer 1 from the primary winding 32 of coupling transformer 31.

The audio amplifier 40, comprised of conventional circuitry, merely increases the amplified transducer output signal sufficiently to drive the speaker 55 or other electroacoustical transducer. As explained above, an irregularity in specimen 8 may result in an audible change in the volume of sound developed by speaker 55. The effect is especially noticeable when tests are conducted on non-ferromagnetic conductive materials. Although the speaker 55 may be replaced by an appropriate meter movement, the availability of a sound signal expedites greatly the scanning procedure in some circumstances, for the operator is not required to move his eyes back and forth between the test specimen and meter indication. Instead, he may concentrate on moving the transducer 1 in an accurate scanning pattern until the occurrence of a sudden increase in sound level signifies to him that the probe is passing over an unacceptable structural irregularity.

The phase-sensitive rectifier 30 provides enhanced sensitivity to structural irregularities in ferromagnetic materials. Residual strains in these materials produce far greater shifts in phase of the transducer output signal than change in amplitude. Although the phase-sensitive rectifier 30 is conventional, a typical circuit is portrayed in order to show clearly its coupling to the oscillator 45 and the tuned amplifier 20.

The unidirectional output voltage of the phase-sensitive rectifier 30 is coupled to a microammeter 60 which transduces the polarity and magnitude of the output voltage and registers it as a change in needle deflection.

Figure 2B:
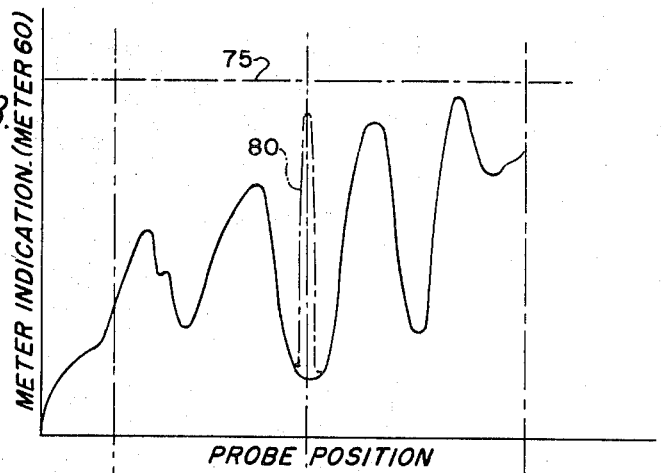
FIG. 2B is a curve representing a typical plot of detector readout signal versus probe position for the turbine blade scan of FIG. 2A.
Figure 2A:
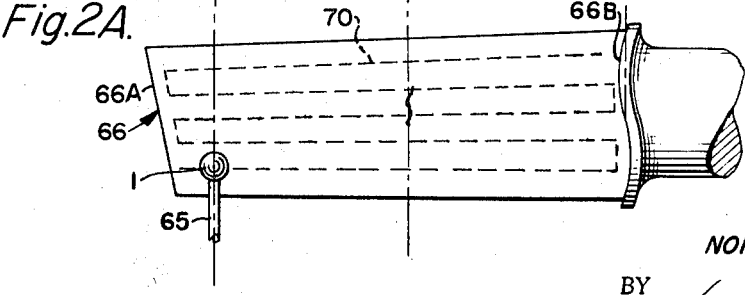
FIG. 2A represents a typical scanning pattern for a turbine blade.

A typical application of the detector for inspecting turbine blades is depicted in FIG. 2A. The apparatus is energized, and the transducer 1, disposed on the end of a probe 65, is passed over each blade 66 in a raster pattern 70 designed to scan the entire blade 66 from tip 66A to shoulder 66B. In the illustrated example, the scan 70 may begin on the blade tip 66A, and continue in back and forth strokes along the surface between the tip and the shoulder 66B, the probe 65 being moved in increments across the blade at the ends of the strokes. In this manner, the entire surface effectively is scanned. Other scanning patterns obviously could be employed if desired. The scanning may be done manually, or in situations, where large quantities of an item are to be inspected rapidly and accurately, with various types of automated equipment. In the latter case, it may be desirable to supplement or replace at least one of the amplitude and phase shift readout devices, 55 and 60, of FIG. 1, with an appropriate recording meter.

The variation of detector readout with probe position is represented in the curve of FIG. 2B. Here, the readout data taken, for example, from meter 60 is plotted on the vertical axis and the probe position on the horizontal axis. The datum line 75 represents the "reject" threshold for residual strains. As shown by the dotted line 80, incipient and actual fractures or voids, or other structural discontinuities, result in an abrupt increase, or transient pulse, in the readout signal. When a response of this type occurs, rejection of the blade 66 is advisable whether or not the meter deviation readout rises above the datum line 75. This condition also will be signified by an audible increase in the audio output of speaker 55.

Figure 3:
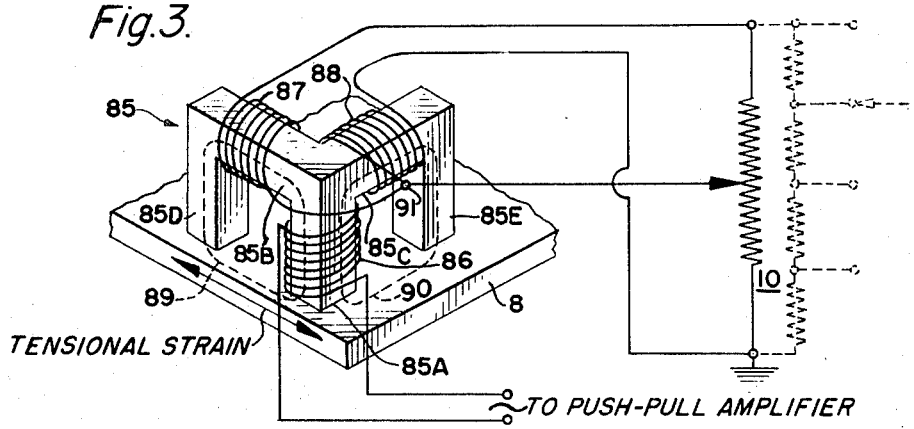
FIG. 3 represents a first modification of the invention characterized by the use of an L-shaped, E-core differential-transformer type transducer.

For measuring unidirectional and uniform strains or stresses, the method and apparatus of this invention are modified as represented in FIG. 3. Here, the E-core 2 of FIG. 1 effectively is bent around the axis of the center leg 2A to form the L-shaped or bent, E-core 85. As in the case of the exemplary embodiment of FIG. 1, bent E-core transducer of FIG. 3 is of the differential-transformer type. A primary winding 86 is disposed on the center leg 85A, and two secondary winding 87 and 88 are disposed on the angularly-related sections 85B and 85C, respectively. As a result, the respective air gaps between center leg 85A and end legs 85D and 85E, and the magnetic circuits 89 and 90 are illustrated.

With the bent E-core configuration, it is easy to detect unidirectional uniform stresses and strains. Thus, where the specimen 8 has a residual tensional strain oriented along lines between center leg 85A and end leg 85D, the effective magnetic impedance of the magnetic circuit 89 will be different from the magneic impedance of magnetic circuit 90. The resultant differential output signal derived from the algebraic addition of the alternating currents induced in secondary windings 87 and 88 at junction 91 will represent the magnitude of the uniform stress or strain.

Figure 4:
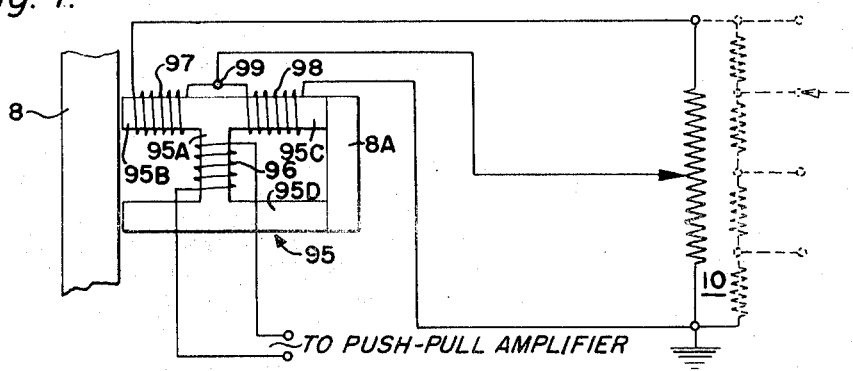
FIG. 4 represents a second modification of the invention characterized by the use of an H-core differential-transformer type transducer.

The second modification of the method and apparatus of this invention is characterized by the presence of an H-core sensor of the type represented in FIG. 4 for facilitating rapid "accept" or "reject" inspection procedures. This probe is comprised of an H-core 95 having a primary winding 96 disposed on the cross segment 95A, and first and second secondary windings 97 and 98 disposed on the oppositely-extending segments 95B and 95C of one of the legs. The secondary windings 97 and 98 are wound or coupled to provide a differential output signal at junction 99. The leg segments 95C and 95D are bridged by a reference number 8C, while the lower leg extensions may be placed in magnetic relation to the test specimen 8.

In a typical application of this modification, the reference member 8C, made, for example, of the same material as the test specimen 8, has a known residual strain or stress of maximum acceptable magnitude. Hence, the transducer output signal approaches zero as the strain or other irregularity in the test specimen 8 increases toward the maximum acceptable level. Accordingly, an indication on meter 60 (FIG. 1) of zero or beyond signifies that the irregularity in the test specimen 8 equals or exceeds the maximum reference level, and that the specimen should be rejected. When the reference member 8C is devoid of irregularities, it constitutes a standard of normality, and enables this modification to be used for quantitive measurements of stress or strain.

Figure 5:
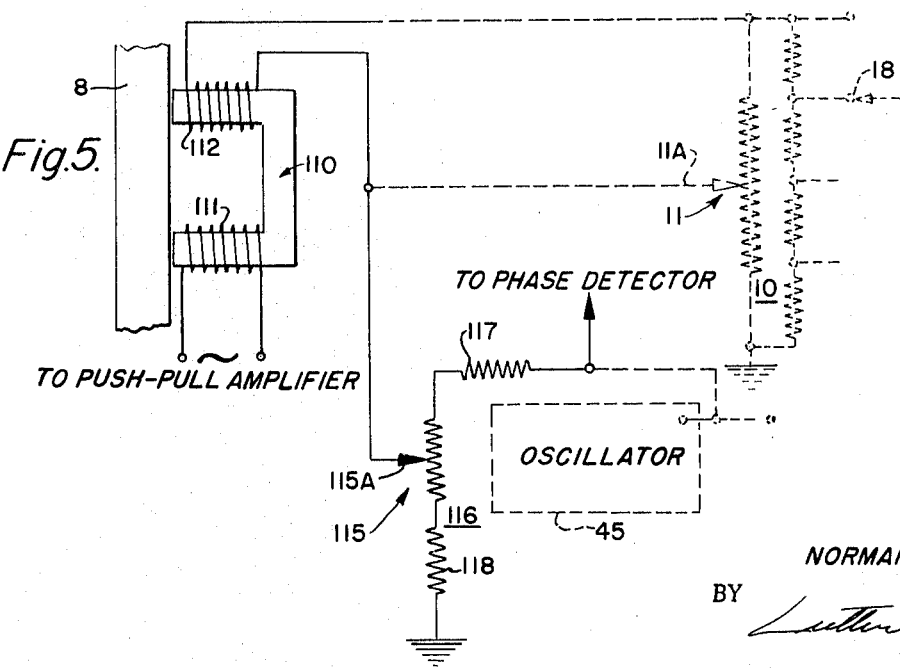
FIG. 5 represents a third modification of the invention characterized by the use of a C-core transformer-type transducer.

The third modification of this invention, represented in FIG. 5, utilizes a transformer-type transducer having a C-core 110 provided with primary and secondary windings 111 and 112, respectively. As in the aforementioned embodiments, the test specimen 8 bridges the gap of the C-core 110 and, depending upon its structural-magnetic characteristics, affects the inductive coupling between the primary and secondary windings 111 and 112, so that the signal, if any, developed in the secondary winding 112 will be equal and opposite to a reference signal whenever the test specimen 8 is devoid of structural-magnetic irregularities, and unequal whenever this condition does not exist.

The reference signal may be derived from oscillator 45 through use of a potentiometer 115 as the center element of a voltage divider 116, coupled between the oscillator output terminal 46 and a ground source of constant potential. The resistor 117 of voltage divider 116 merely prevents the oscillator 45 from being grounded, and resistor 118 prevents the secondary winding 112 from being subjected to excessive oscillator output power. The reference voltage provided at potentiometer wiper arm 115A is preset to an amplitude which is equal to that developed by secondary winding 112 when the test specimen 8 has normal structural-magnetic characteristics. Alternatively the potentiometer 115 may be preset to the voltage developed by secondary winding 112 when the structural-magnetic characteristics of the test specimen 8 are at a limit of acceptability. Inasmuch as the oscillator 45 also energizes the primary winding 111, the voltage developed across secondary winding 112 will be reversed by 180° with respect to the reference voltage. Hence, the reference and secondary voltages will tend to cancel when added algebraically at the potentiometer wiper arm 11A of the balancing and attenuating network 10. Accordingly, the reference voltage will nullify the transducer output signal when the structural-magnetic characteristics of the test specimen 8 are normal, or, if the reference potentiometer is so adjusted, when these characteristics of the test specimen 8 approach the preset limit of acceptability.

The advantages of this configuration are its very small size, and its ready adaptability to use either for rapid "accept" and "reject" inspections, or for quantitative measurements of stress or strain.

It should be evident, of course, that the transducer output signal may be amplified in one or more stages of the tuned amplifier 20 before it is combined with the reference signal. This expedient may have the effect of reducing spurious components as well as rendering less critical the preadjustment of reference voltage.

It is anticipated that the novel concepts expressed or inferrible from the drawings and text of this disclosure will enable the design of a variety of embodiments within the scope of this invention, as represented in the following claim.

What is claimed is:
1. In an apparatus for detecting differences between the magnetic characteristics of different portions of a material, the apparatus having,
   first and second magnetic circuits each having an air gap and each circuit having substantially the same value of magnetic reluctance;
   a primary winding inductively coupled in substantially equal amounts to both magnetic circuits;
   a first secondary winding inductively coupled to said first magnetic circuit;
   a second secondary winding inductively coupled to said second magnetic circuit;
   an oscillator for producing a first alternating current having a given frequency and amplitude, said first alternating current being fed to said primary winding;
   said first and second secondary windings producing a second alternating current and a third alternating current, respectively, that have said given frequency and equal amplitudes and are connected in series so that said second and third currents are 180° out-of-phase with each other when the portions of said material against both said air gaps have substantially the same magnetic characteristics, and said second and third alternating currents are not 180° out-of-phase with each other and have nonequal amplitudes when the portion of said material against one air gap does not have substantially the same magnetic characteristics as the portion of said material against the other air gap; said second and third currents combining in said series circuit to produce a fourth alternating current across both windings;
the improvements comprising:
   a junction intermediate said first and second secondary windings;
   a potentiometer, connected in parallel with said first and second secondary windings, having a wiper arm, said wiper arm operably connected to said intermediate junction of said first and second secondary windings;
   a voltage divider circuit comprising series-connected resistances operably connected in parallel with said potentiometer, said potentiometer and said voltage divider circuit responsive to said fourth alternating current;
   a tuned amplifier tuned to the oscillator frequency operably connected to said voltage divider circuit and responsive thereto;
   a phase detector including a coupling transformer having a primary coil and a center-tapped secondary coil, said center-tapped secondary coil operably connected by its center-tap to said tuned amplifier and said primary coil connected directly to said oscillator;
   and a push-pull amplifier means connected between said oscillator and said primary winding of said magentic circuits whereby an analog electrical signal is produced whose voltage value is determined by the amount of phase difference between said first and fourth alternating currents and by the magnitude of the amplitude of said fourth alternating current.

References Cited

UNITED STATES PATENTS

| | | | |
|---|---|---|---|
| 2,266,620 | 12/1941 | Coffmen | 324—40 |
| 2,311,715 | 2/1943 | Thorne | 324—37 |
| 2,531,414 | 11/1950 | Engvall | 324—34 |
| 2,921,298 | 1/1960 | Jackson | 324—34 |
| 3,201,562 | 8/1965 | Anderson | 324—37 |
| 2,918,621 | 12/1959 | Callan et al. | 324—37 |
| 2,858,505 | 10/1958 | Shawhan | 324—41 |
| 3,247,453 | 4/1966 | Quittner | 324—37 |
| 3,271,662 | 9/1966 | Quittner. | |
| 3,273,055 | 9/1966 | Quittner | 324—37 |

FOREIGN PATENTS

| | | |
|---|---|---|
| 626,558 | 8/1961 | Canada. |
| 716,410 | 10/1931 | France. |
| 573,182 | 11/1945 | Great Britain. |
| 626,558 | 8/1961 | Canada. |

RUDOLPH V. ROLINEC, Primary Examiner

R. J. CORCORAN, Assistant Examiner